United States Patent
Khanna et al.

(10) Patent No.: US 10,984,065 B1
(45) Date of Patent: Apr. 20, 2021

(54) ACCESSING EMBEDDED WEB LINKS IN REAL-TIME

(71) Applicant: International Business Machines Corporation, Armonk, NY (US)

(72) Inventors: Hitesh V Khanna, Naperville, IL (US); Blaine H. Dolph, Western Springs, IL (US); Shamayun Miah, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/588,005

(22) Filed: Sep. 30, 2019

(51) Int. Cl.
*G06F 15/16* (2006.01)
*G06F 16/955* (2019.01)
*G06F 21/34* (2013.01)
*H04L 29/06* (2006.01)

(52) U.S. Cl.
CPC ...... *G06F 16/9566* (2019.01); *G06F 16/9558* (2019.01); *G06F 21/34* (2013.01); *H04L 65/4053* (2013.01)

(58) Field of Classification Search
CPC .. G06F 16/9558; G06F 16/9566; G06F 21/34; H04L 65/4053
See application file for complete search history.

(56) References Cited

U.S. PATENT DOCUMENTS

| 7,043,526 | B1 * | 5/2006 | Wolfe | H04L 67/20 709/203 |
| 8,424,037 | B2 * | 4/2013 | Landow | H04N 21/222 725/43 |
| 9,769,545 | B2 | 9/2017 | Begeja | |
| 9,870,346 | B2 | 1/2018 | Chitta | |
| 2003/0229900 | A1 * | 12/2003 | Reisman | H04N 21/42204 725/87 |
| 2007/0089158 | A1 * | 4/2007 | Clark | H04N 21/4622 725/135 |
| 2008/0288600 | A1 * | 11/2008 | Clark | H04N 21/6175 709/206 |

(Continued)

FOREIGN PATENT DOCUMENTS

| EP | 1226518 B1 | 7/2008 |
| EP | 2564372 A4 | 4/2017 |
| WO | 2014144062 A1 | 9/2014 |

OTHER PUBLICATIONS

"Free Online OCR", Copyright © 2009-2019 Sciweavers LLC, CR, 4 pps., <http://www.i2ocr.com/>.

*Primary Examiner* — Cheikh T Ndiaye
(74) *Attorney, Agent, or Firm* — Marcus Walker

(57) ABSTRACT

Aspects of the present invention disclose a method for providing access to hyperlinks on-demand in real-time from a livestream. The method includes one or more processors determining a set of coordinates on a display of a computing device corresponding to an interaction from a user with a video presentation. The method further includes extracting a subset of pixels from an image of the display of the computing device that corresponds to the set of coordinates. The method further includes extracting a uniform resource locator (URL) from the subset of pixels of the image. The method further includes validating the extracted URL from the subset of pixels of the image. The method further includes providing content corresponding to the extracted URL from the subset of pixels of the image to the user.

20 Claims, 6 Drawing Sheets

(56) References Cited

U.S. PATENT DOCUMENTS

| | | | |
|---|---|---|---|
| 2010/0259559 A1* | 10/2010 | Schneider | G06T 11/60 |
| | | | 345/629 |
| 2011/0313856 A1* | 12/2011 | Cohen | G06F 16/433 |
| | | | 705/14.49 |
| 2015/0326925 A1* | 11/2015 | Ozkan | H04N 21/858 |
| | | | 725/36 |
| 2017/0293594 A1 | 10/2017 | Glennon | |
| 2018/0018532 A1 | 1/2018 | Duong | |
| 2019/0236214 A1 | 8/2019 | Kokernak | |

* cited by examiner

ACCESSING EMBEDDED WEB LINKS IN REAL-TIME

BACKGROUND OF THE INVENTION

The present invention relates generally to the field of streaming intelligence, and more particularly to accessing weblinks of a live video stream.

In recent years, the growth of online collaborative services (e.g., web seminars, webcasts, peer-level web meetings, etc.) have produced opportunities for innovation in the features associated with the services. Video files of web seminars may contain embedded links to content that includes additional information about the speakers and/or content discussed during the seminar.

A link is a method to add a reference to external content (e.g., document, image, uniform resource locator, etc.), allowing access to the external content in response to a selection of the link. Although the external content can be stored independent of the content that includes the link, a user that does not have access to the external content directly may access the content via a link. Embedding is a method to incorporate external content into an existing file, where the result is external content is now accessible through the existing file.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for providing access to hyperlinks on-demand in real-time from a livestream. The method includes one or more processors determining a set of coordinates on a display of a computing device corresponding to an interaction from a user with a video presentation. The method further includes one or more processors extracting a subset of pixels from an image of the display of the computing device that corresponds to the set of coordinates. The method further includes one or more processors extracting a uniform resource locator (URL) from the subset of pixels of the image. The method further includes one or more processors validating the extracted URL from the subset of pixels of the image. The method further includes one or more processors providing content corresponding to the extracted URL from the subset of pixels of the image to the user.

DETAILED DESCRIPTION

Embodiments of the present invention allow for providing access to content of weblinks within a live on-line presentation and/or video to a user on multiple devices in real-time. Embodiments of the present invention extract weblinks from a live on-line presentation utilizing an image extraction algorithm and optical character recognition techniques. Additional embodiments of the present invention allow for providing collected user activity data associated with a user interaction to a user for feedback and/or analytics.

Some embodiments of the present invention recognize that when viewing a presentation in a video stream on a browser a user is unable to open hyperlinks in presentation content. Consequently, a user must request the material from the presenter, which can be a timely process with access/permissions issues and can result in the user losing context and interest in the topic of the presentation during that manual retrieval process. Similarly, challenges exist when a weblink is visible in a video, but the weblink is not interactive. Thus, a user must memorize or record a universal resource locator (URL) of the weblink that is visible within the video and manual input the URL to access the corresponding content. Various embodiments of the present invention resolve these problems utilizing an image extraction algorithm and optical character recognition techniques to extract weblinks from a live on-line presentation and open the weblink in a separate browser window. Thus, the present invention optimizes the process by reducing the amount of time needed to retrieve content corresponding to the weblink and eliminating manual retrieval steps.

Embodiments of the present invention can operate to reduce the amount of processing resources utilized to retrieve content from a live video by only processing data corresponding to a user interaction as opposed to ingesting and scanning the entirety of the video. Additionally, various embodiments of the present invention improve retrieval process by performing the task in real-time on a client-side application that increases the amount of server resources that may be utilized. Furthermore, various embodiments of the present invention support all types of media that can render digital content.

Implementation of embodiments of the invention may take a variety of forms, and exemplary implementation details are discussed subsequently with reference to the Figures.

Figure 1:
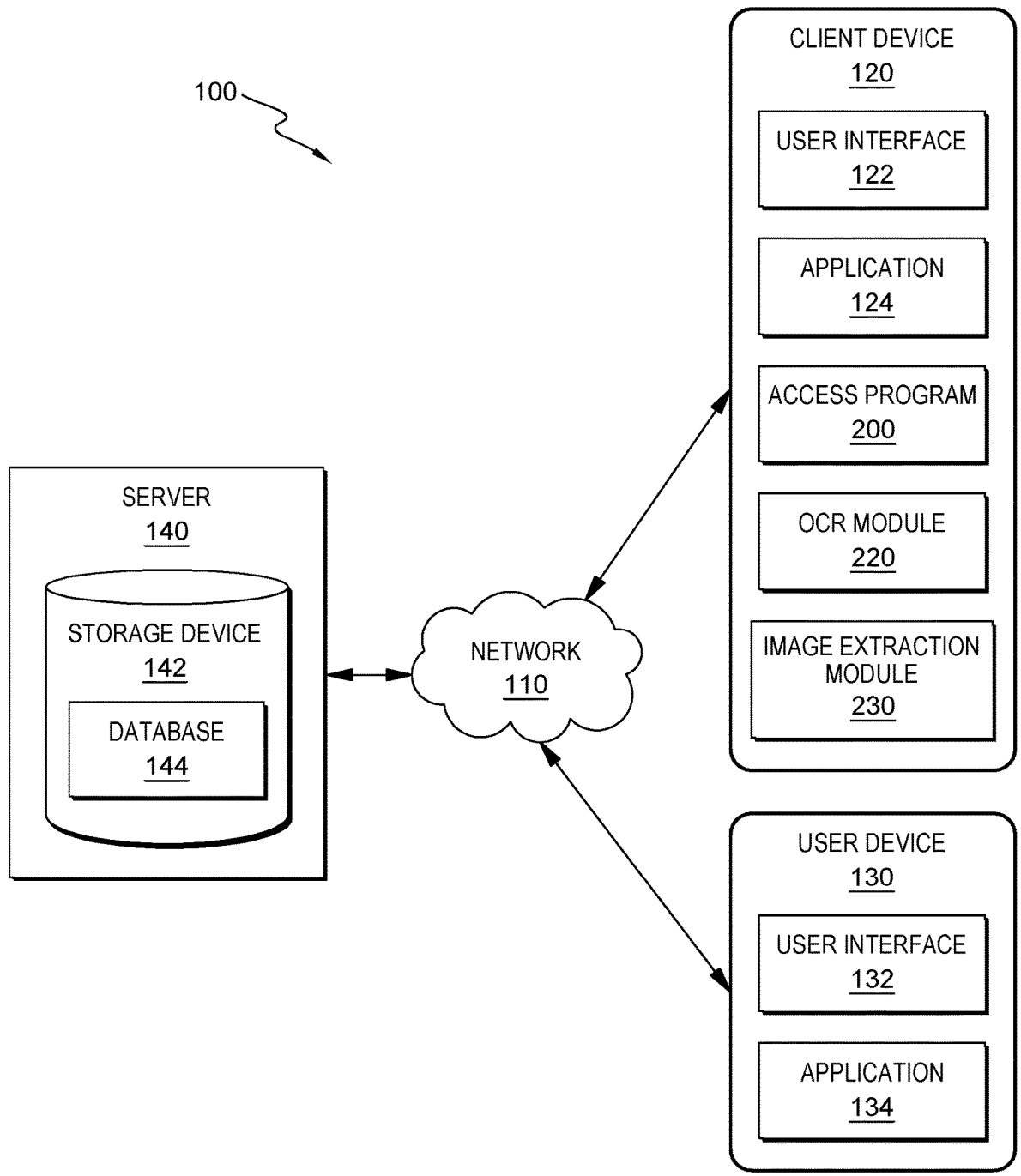
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Various embodiments of the present invention can utilize accessible sources of personal data, which may include personal devices (e.g., client device 120) social media content, and/or publicly available information. For example, embodiments of the present invention can optionally include a privacy component that enables the user to opt-in or opt-out of exposing personal information. The privacy component can enable the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

An embodiment of data processing environment 100 includes client device 120, user device 130 and server 140, all interconnected over network 110. In one embodiment, client device 120, user device 130 and server 140 communicate through network 110. Network 110 can be, for example, a local area network (LAN), a telecommunications network, a wide area network (WAN), such as the Internet, or any combination thereof, and include wired, wireless, or fiber optic connections. In general, network 110 can be any combination of connections and protocols, which will support communications between client device 120, user device 130 and server 140, in accordance with embodiments of the present invention. For example, a user of a mobile device (e.g., client device 120) views a presentation of a web conference and extracts a link to a webpage, which is opened on a laptop (e.g., user device 130) of the user via the Internet (e.g., network 110), and transmits the data to a server (e.g., server 140) for storage.

Client device 120 can be any device capable of executing computer readable program instructions. In various embodiments of the present invention, client device 120 may be a workstation, personal computer, digital video recorder, media player, personal digital assistant, mobile phone, or any other device capable of executing computer readable program instructions, in accordance with embodiments of the present invention. For example, client device 120 is a mobile device, which a user utilizes to respond to a customer review posted on a social media site. Client device 120 may include components as depicted and described in further detail with respect to FIG. 5, in accordance with embodiments of the present invention.

Client device 120 includes user interface 122, application 124, optical character reader (OCR) module 220, image extraction module 230, and access program 200. In various embodiments of the present invention, a user interface is a program that provides an interface between a user of a device and a plurality of applications that reside on the client device. Additionally, user device 130 includes a respective instance of user interface 122 (e.g., user interface 132) and application 124 (e.g., application 134), which encompass equivalent functionality. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content. For example, application 124 is a web browser of a personal computer that a user can utilize to access live stream presentations. In another example, application 124 is a web conferencing application utilized to broadcast presentations to a plurality of users. In another embodiment, a user utilizes application 124 of client device 120 to register access program 200 and define user preferences. For example, application 124 is a web browser of a mobile device that a user can utilize to set actions and notification settings for defined actions in response to comment program validating a comment.

Optical character recognition or optical character reader (OCR) is the mechanical or electronic conversion of images of typed, handwritten or printed text into machine-encoded text, whether from a scanned document, a photo of a document, a scene-photo or from subtitle text superimposed on an image. In various embodiments of the present invention image OCR module 220 is a module of access program 200. Generally, OCR module 220 is capable of producing a high degree of recognition accuracy for most fonts are now common, and with support for a variety of digital image file format inputs. Furthermore, OCR module 220 is capable of reproducing formatted output that closely approximates the original page including images, columns, and other non-textual components.

In one embodiment, OCR module 220 transforms an image that includes a uniform resource locator (URL) from a screenshot of client device 120 to a textual representation. For example, OCR module 220 scans a captured image of a laptop (e.g., client device 120) that includes a presentation slide of weblinks (e.g., URLs). In this example, OCR module 220 identifies characters within the captured image and provides a textual representation of one of the weblinks of the presentation slide to access program 200. In another embodiment, OCR module 220 is a tool of client device 120.

Image extraction module 230 is an image processing application, in which an algorithm is used to detect and isolate various desired portions or shapes (e.g., features) of a digitized image or video stream. In various embodiments of the present invention image extraction module 230 is a module of access program 200. Feature extraction is particularly important in the area of optical character recognition. In one embodiment, image extraction module 230 detects a feature corresponding to a user interaction with a presentation of client device 120. For example, image extraction module 230 uses a user interaction (e.g., click) with a portion of a captured image of a laptop as a reference point to identify features within the captured image. In this example, image extraction module 230 may utilize low level (e.g., blob, corner, edge, etc.) or shape based (e.g., blob extraction, Hough transform, etc.) image processing techniques to identify a URL in the captured image.

In various embodiments of the present invention, steps of access program 200 are repeated each time a user clicks on a URL that the user is interested in during a presentation or while viewing the video/movie. Access program 200 functions in real-time without interrupting the ability of a user to view the presentation or movie. Due to access program 200 functioning in real-time and on demand, access program 200 provides the user the ability to view the content corresponding to the URL and ask any related queries to the presenter while the topic is being discussed or viewed.

Access program 200 provides access to hyperlinks on-demand in real-time from a livestream. In one embodiment, access program 200 utilizes OCR module 220 and image extraction module 230 to extract a weblink from an image of client device 120. For example, access program 200 uses extraction module 230 to identify a URL (e.g., feature) corresponding to a user interaction (e.g., selecting, clicking, etc.) with a captured image (e.g., screenshot) of a laptop (e.g., client device 120). In this embodiment, OCR module 220 can transform one or more characters of the captured image into a textual representation corresponding to the URL.

In another embodiment, access program 200 provides a user with an option to select from one or more instances of user device 130 or client device 120 to provide the content of the weblink. For example, access program 200 identifies one or more devices connected to network 110 that are capable of rendering contents of a URL. In another embodiment, access program 200 collects data corresponding to a user of client device 120 and provides the collected data to a presenter. For example, access program 200 collects, stores in storage device 142, and provides to a presenter of a presentation user activity (e.g., number of interactions with the presentation, content requested, etc.).

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100. In general, server 140 is representative of any electronic device or combination of electronic devices capable of executing computer readable program instructions. Server 140 may include components as depicted and described in further detail with respect to FIG. 5, in accordance with embodiments of the present invention.

In various embodiments, users authorize access program 200 to collect and store information associated with devices and users, which have authorized the collection of information (i.e., users that have opted-in), in storage device 142. In one scenario, an owner of client device 120 authorizes access program 200 to collect and store data (e.g., comments, customer feedback, textual data, user interactions, etc.) of application 124. In another scenario, an owner of client device 120 authorizes access program 200 to perform a defined action on behalf of the owner using collected information of application 124. In an alternative embodiment, user's opt-in to utilize access program 200. For example, a user visits a website associated with access program 200 and the users accept the terms and conditions of access program 200 as a part of the registration process.

Server 140 includes storage device 142, which includes database 144. Storage device 142 can be implemented with any type of storage device, for example, persistent storage 505, which is capable of storing data that may be accessed and utilized by server 140, client device 120, and user device 130, such as a database server, a hard disk drive, or a flash memory. For example, database 144 may include validation status of a hyperlink, user interactions with a video presentation, user interests, etc. In one embodiment storage device 142 can represent multiple storage devices within server 140. In various embodiments of the present invention storage device 142 stores a plurality of information, such as one or more instances of database 144. In another embodiment, data processing environment 100 can include additional servers (not shown) that host additional information that accessible via network 110.

Figure 2:
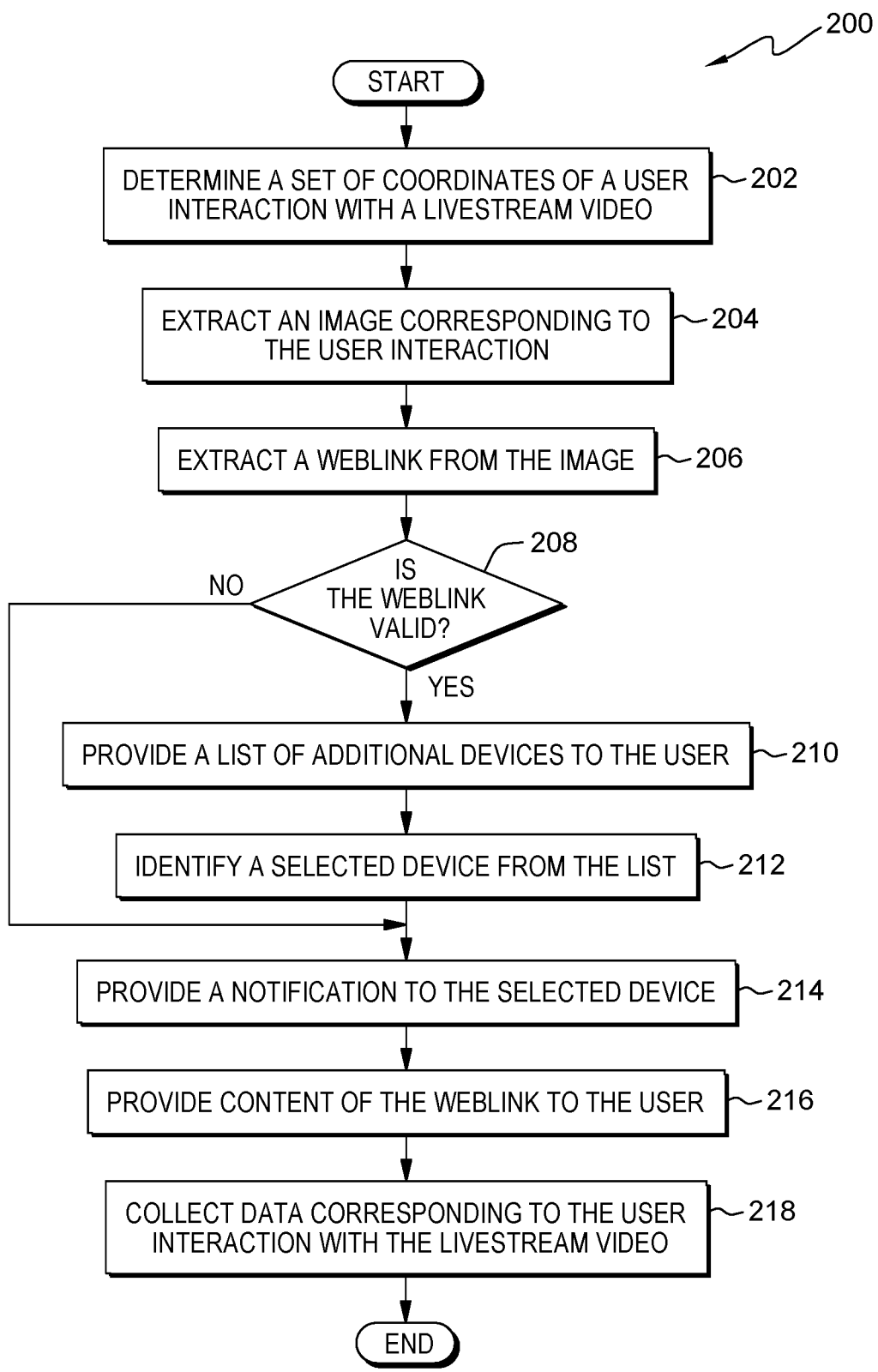
FIG. 2 is a flowchart depicting operational steps of a program, within the data processing environment of FIG. 1, for providing access to hyperlinks on-demand in real-time from a livestream, in accordance with embodiments of the present invention.

FIG. 2 is a flowchart depicting operational steps of access program 200, a program for providing access to hyperlinks on-demand in real-time from a livestream, in accordance with embodiments of the present invention. In one embodiment, access program 200 initiates in response to detecting that a user interacts with a livestream. For example, access program 200 monitors a graphical user interface of a laptop to determine that a user clicks (e.g., user interaction) a portion of a presentation in a livestream.

In step 202, access program 200 determines a set of coordinates of a user interaction with a livestream video. In one embodiment, access program 200 monitors user interface 122 determine a set of coordinates corresponding to a user interaction with video content of client device 120. For example, access program 200 monitors a GUI (e.g., user interface 122) of a laptop (e.g., client device 120) of a user to identify a click point of the user with respect to a video stream of a presentation of a web conferencing application (e.g., application 124). In this example, access program 200 detects a user interaction (e.g., a user selection) and records the x-coordinate and y-coordinate from data of the GUI that corresponds to the click point of the user on the screen of the laptop. Additionally, access program 200 captures an image of the screen of the laptop that corresponds to the click point of the user (i.e., screenshot).

Figure 3A:
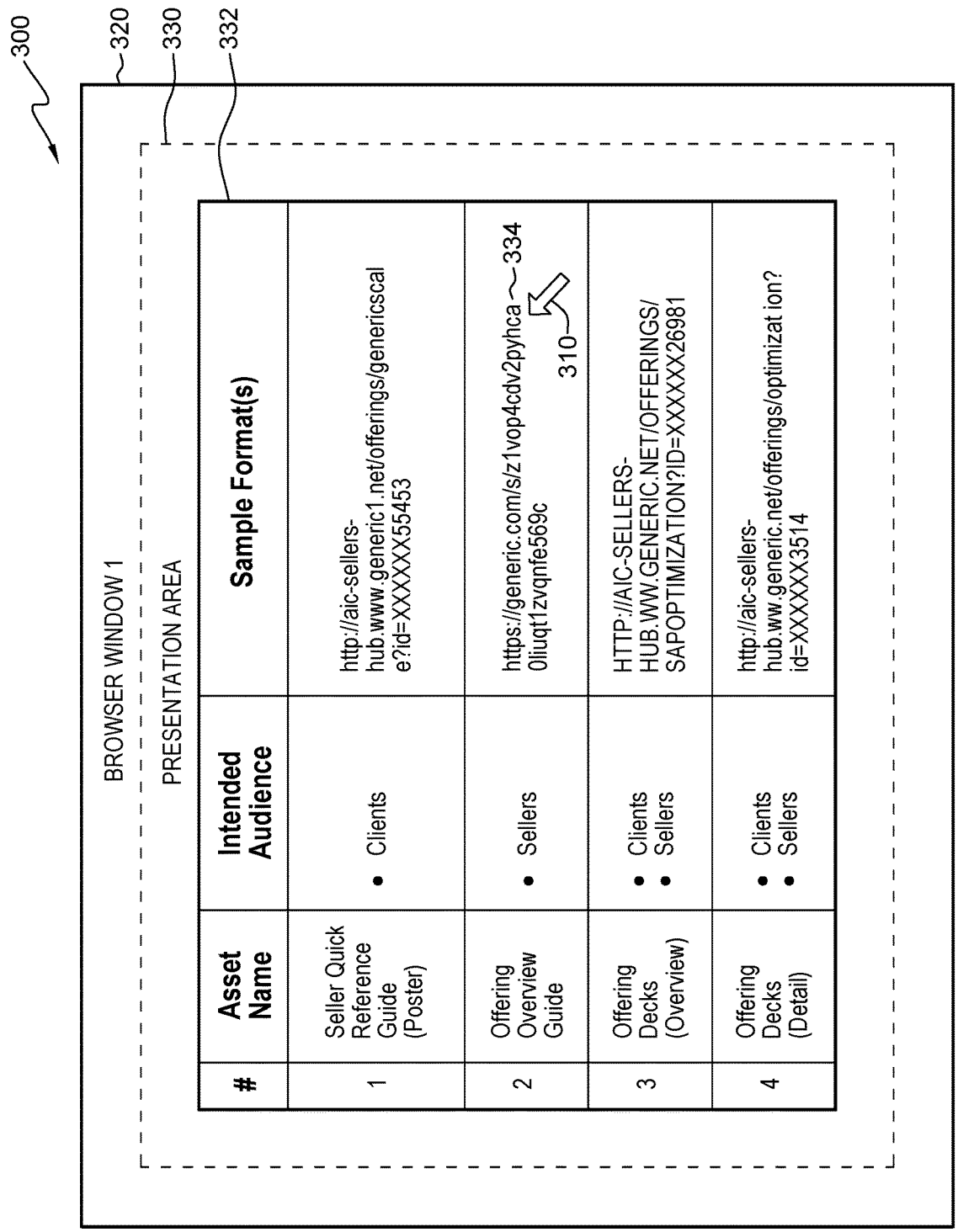
FIG. 3A is an example depiction of an image of a video presentation on a display of a computing device within the data processing environment of FIG. 1, in accordance with embodiments of the present invention.

FIG. 3A depicts screen capture 300, which is an illustration of an image of client device 120 during an online presentation. Screen capture 300 includes cursor 310, browser window 320, slide 330, table 332, and URL 334. Cursor 310 is a graphical image that is used to activate or control certain elements in a graphical user interface. Browser window 320 is a software application used to locate, retrieve and display content on the World Wide Web, including webpages, images, video and other files. In this example embodiment, browser window 320 includes slide 330. Slide 330 is a single page of a presentation that includes table 332, which is a table of a presentation that includes hyperlinks (e.g., URL 334) to content discussed in the presentation.

In an example embodiment, access program 200 monitors cursor 310 of client device 120 to detect a click (e.g., user interaction) with slide 330 of browser window 320. In this example embodiment, access program 200 captures slide 330 of screen capture 300 in response to the user interaction via cursor 310. Additionally, access program 200 utilizes the position of cursor 310 to determine x-coordinate and y-coordinate of the user interaction with respect to slide 330.

In step 204, access program 200 extracts an image corresponding to the user interaction. In one embodiment, access program 200 utilizes image extraction module 230 to extract a portion of an image of client device 120. For example, access program 200 extracts a portion of a screenshot corresponding to a click point of a user. In this example, access program 200 provides a coordinate of the click point to an image processing application (e.g., image extraction module 230) to perform low level image processing techniques (e.g., blob detection, edge detection, corner detection, etc.) to scan an area around the click point until the image processing application detects whitespace or specific predefined strings of characters (e.g., http//, https//, www., etc.).

Figure 3B:
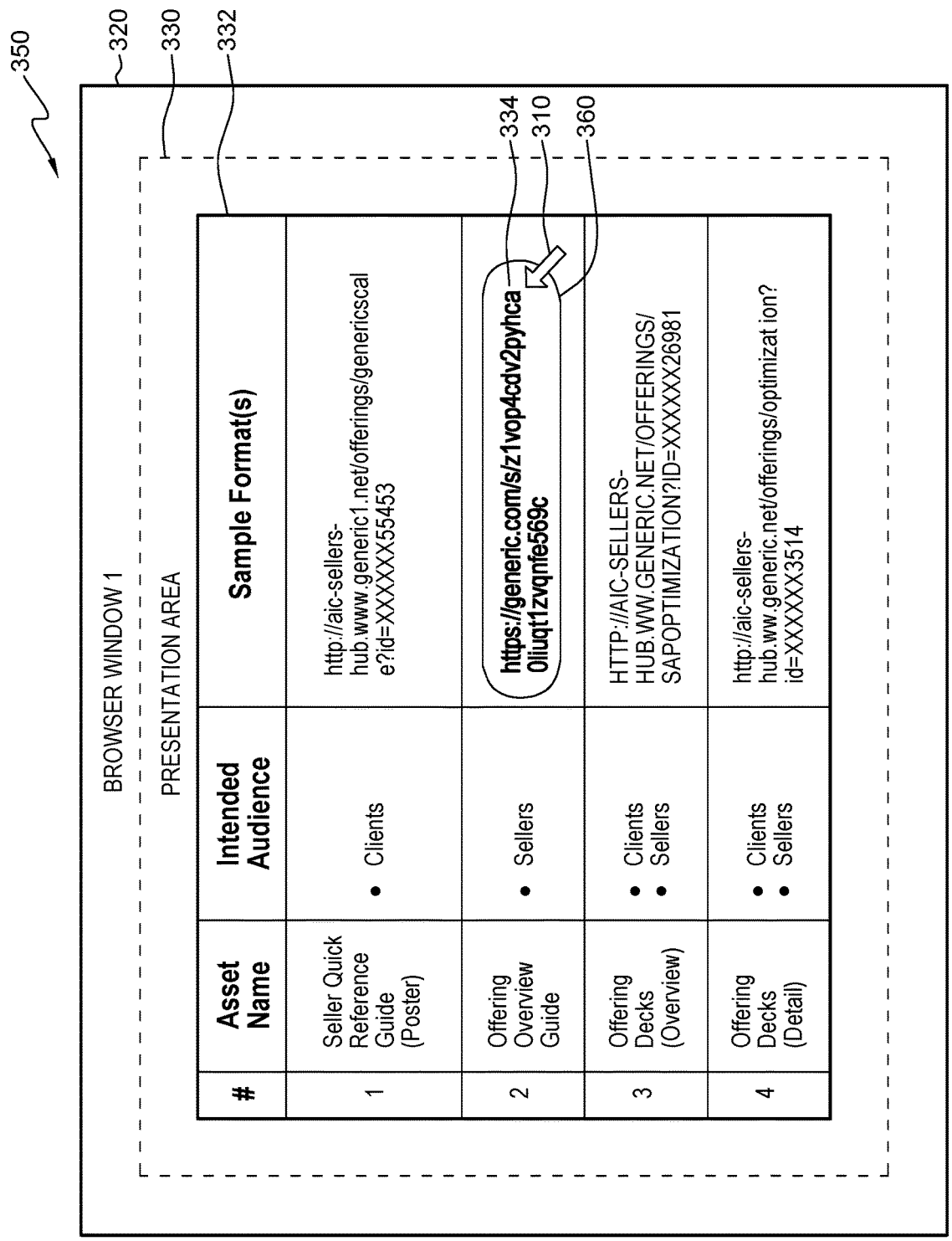
FIG. 3B is an example depiction of an image of image extraction during a video presentation on a display of a computing device within the data processing environment of FIG. 1, in accordance with embodiments of the present invention.

FIG. 3B depicts screen capture 350, which is an illustration of screen capture 300 of client device 120 during an online presentation during image extraction. Screen capture 350 includes cursor 310, browser window 320, slide 330, table 332, URL 334, and extraction area 360. Cursor 310 is a graphical image that is used to activate or control certain elements in a graphical user interface. Browser window 320 is a software application used to locate, retrieve and display content on the World Wide Web, including webpages, images, video and other files. In this example embodiment browser window 320 includes slide 330. Slide 330 is a single page of a presentation that includes table 332, which is a table of a presentation that includes hyperlinks (e.g., URL 334) to content discussed in the presentation. Extraction area 360 is an area corresponding to user interaction that is produced by image extraction module 230 scanning the area that includes URL 334 and the user interaction.

In an example embodiment, access program 200 utilizes x-coordinate and y-coordinate of the user interaction determined in FIG. 3A to initialize scanning of an area to identify image characters that correspond to the user interaction. In this example, embodiment, access program 200 utilizes image extraction module 230 to scan around the user interaction coordinates to identify images of characters of URL 334. Additionally, access program 200 extracts extraction area 360 which includes the images of characters of URL 334.

In step 206, access program 200 extract a weblink from the image. In one embodiment, access program 200 utilizes OCR module 220 to extract a weblink from a portion of an image of client device 120. For example, access program 200 utilizes computer vision techniques (e.g., optical character recognition) to scan an extracted image to identify characters of a weblink within the extracted image. Additionally, access program 200 utilizes optical character recognition to return identified characters of the weblink in a textual data form. In this example, OCR module 220 may be hosted on a cloud-based server, installed on a dedicated server within an enterprise, installed as software on client device 120, or available as plug-in to a video content renderer.

In an example embodiment, access program 200 utilizes OCR module 220 to produce a textual representation of images of characters of URL 334 that are included in extraction area 360. In this example embodiment, access program 200 utilizes OCR module 220 to analyzes pixel coordinates of extraction area 360 that corresponds to the user interaction to identify text extraction area 360 that represent URL 334. Additionally, access program 200 provides the identified text to a user in a notification message.

In decision step 208, access program 200 determines whether the weblink is valid. In various embodiments of the present invention access program 200 performs a validation routine on an extracted weblink of a presentation. In one embodiment, access program 200 determines whether a weblink of a portion of an image of client device 120 is valid. For example, access program 200 opens a browser (e.g., application 124) of laptop (e.g., client device 120) of the user in the background and loads an extracted URL of a portion of an image. In this example, access program 200 determines whether the URL is broken and/or if the URL requires permission credentials to access.

If access program 200 determines that a weblink of a portion of an image of client device 120 is not valid (decision step 208, "NO" branch), then access program 200 provides a notification a user (as discussed in step 214 below). In one scenario, if access program 200 opens a browser (e.g., application 124) of laptop (e.g., client device 120) of a user in the background and loads an extracted URL of a portion of an image into a browser window, which fails to load content corresponding to the extracted URL or the content requires a username and password, then access program 200 generates a notification on the laptop of the user informing the user of a status (e.g., validation failure) of the extracted URL. Additionally, access program 200 may provide the notification in a window to a host of the presentation or to a viewer of the presentation.

In step 210, access program 200 provides a list of additional devices to the user. More specifically, in response to access program 200 determining that a weblink of a portion of an image of client device 120 is valid (decision step 208, "YES" branch), access program 200 utilizes network 110 to identify one or more instances of user device 130 and provide a list to client device 120.

For example, access program 200 opens a browser (e.g., application 124) of laptop (e.g., client device 120) of a user in the background and loads an extracted URL of a portion of an image into a browser window, which renders the content corresponding to the extract URL. In this example, access program 200 queries a WLAN that the laptop of the user is connected to in order to identify additional devices (e.g., user device 130) connected to the WLAN. Additionally, access program 200 displays one or more additional devices connected to the WLAN to a user on the laptop of the user. Furthermore, the user may select a device from the provided list, or the user may elect to display the rendered content on a current device (e.g., client device 120). In the current example, access program 200 provides the ability to view linked content of a presentation on a device of choice of the user, which enhances capabilities of a web conferencing application by creating an option to redirect and render content of the URL in a browser running on the laptop of the user or on a device of choice in situations where processing resources are limited due to the livestream.

In step 212, access program 200 identifies a selected device from the list. In one embodiment, access program 200 monitors user interface 122 to determine whether a user selected a device of a provided list. For example, access program 200 monitors a laptop (e.g., client device 120) of the user to detect a user interaction with a provided list of devices (as discussed in step 210). In this example, access program 200 monitors a GUI of the laptop to determine which device of the provided corresponds to a click point of the user. In another example, access program 200 may monitor commands corresponding to A GUI of a laptop to determine which device a user selects based on an identifier (e.g., device name) of the device.

In step 214, access program 200 provides a notification to the selected device. In one embodiment, access program 200 provides a notification to client device 120. For example, access program 200 may provide the notification in a pop-up window to a host of a presentation that an extracted URL failed to validate. In another embodiment, access program 200 provides a notification to user device 130. For example, access program 200 generates an interactive notification message that includes an extracted URL, which may be a clickable hyperlink to content corresponding to the extracted URL. In this example, a user may click the hyperlink to authorize access program 200 open a browser to render the corresponding content. In another example, access program 200 can transmit a notification message to a laptop of a user that includes information corresponding to errors (e.g., URL failure status, access status, incomplete URL extraction, etc.) as mentioned above in decision step 208.

In step 216, access program 200 provides content of the weblink to the user. In one embodiment, access program 200 provides content of a weblink to client device 120. For example, access program 200 utilizes the device selection of a user and interaction with a URL of a generated notification to open a separate browser window on a laptop (e.g., client device 120) of the user to present to the user the content corresponding to the URL while the original livestream presentation continues to play in a parallel web session.

In another example, access program 200 can render and direct content corresponding to the URL on a mobile device (e.g., user device 130) of a user in response to a laptop (e.g., client device 120) experiencing latency issues with an original livestream presentation. Furthermore, access program 200 allows for the ability to view corresponding content and the original livestream presentation in parallel by offloading the corresponding content on a mobile device of the user, which improves the performance of the laptop of the user by reducing processing resources utilized by the laptop. In another example, access program 200 may store content of an URL and the URL in a server database (e.g., database 144). In yet another example, access program 200 may temporarily store (e.g., cache 503) content including an extracted URL and user interaction on a computing device (e.g., client device 120) until a presentation is complete, and transmit the content to a server to provide to a host.

Figure 4:
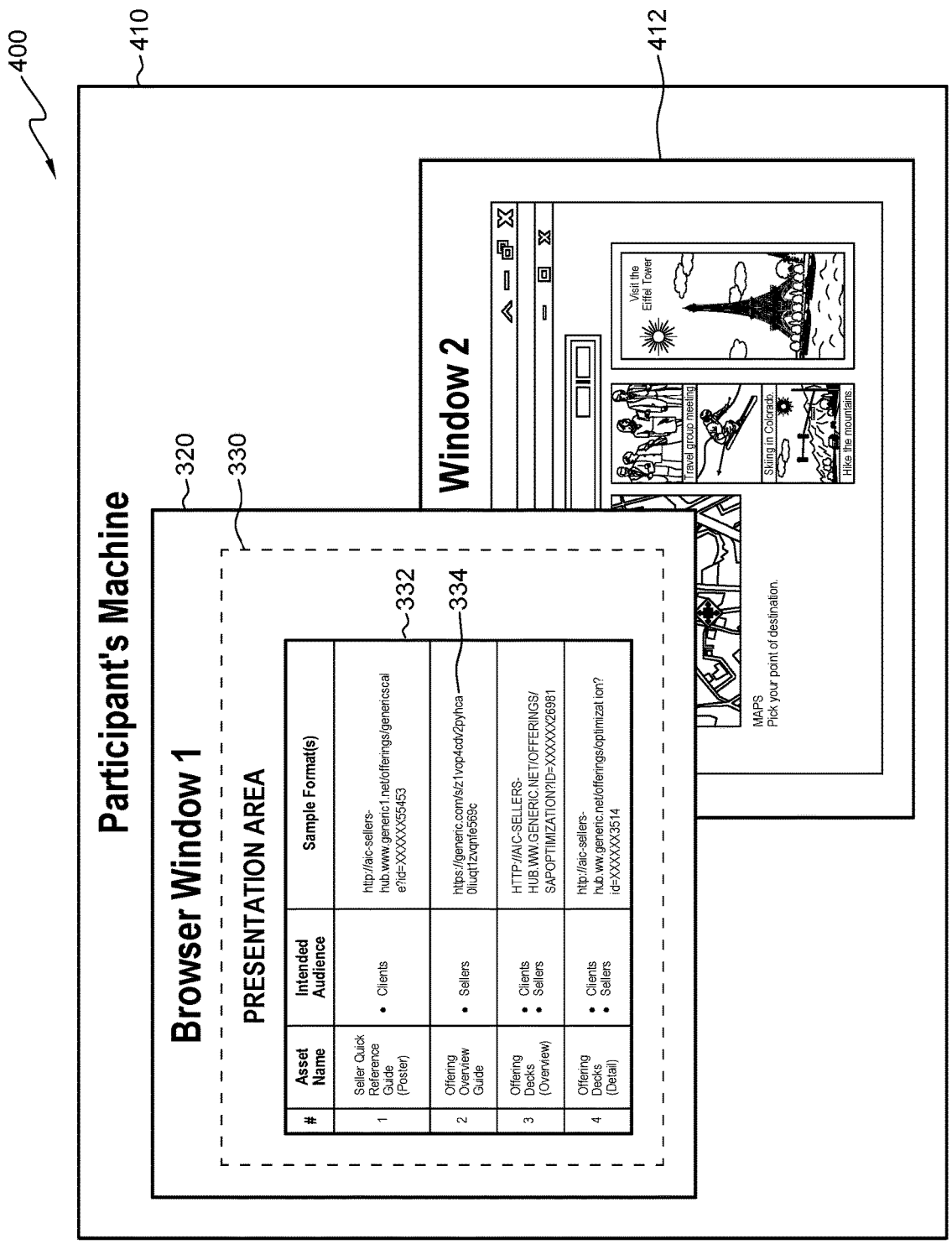
FIG. 4 is an example depiction of rendering of content of an extracted uniform resource locator on a display of a computing device within the data processing environment of FIG. 1, in accordance with embodiments of the present invention.

FIG. 4 depicts computing device screen 400, which is an illustration of a display of client device 120 during an online presentation. Computing device screen 400 includes display 410, browser window 412, browser window 320, slide 330, table 332, and URL 334. Display 410 is output surface and projecting mechanism that shows text and often graphic images to a user of client device 120. Browser window 412 is a software application used to locate, retrieve and display content on the World Wide Web, including webpages, images, video and other files, and in this example embodiment browser window 412 includes content corresponding to URL 334. Browser window 320 is a software application used to locate, retrieve and display content on the World Wide Web, including webpages, images, video and other files, and in this example embodiment browser window 320 includes slide 330. Slide 330 is a single page of a presentation that includes table 332, which is a table of a presentation that includes hyperlinks (e.g., URL 334) to content discussed in the presentation.

In an example embodiment, access program 200, in response to determining that a user selected a textual representation of URL 334 from a generated notification message, access program 200 opens browser window 412 on display 410 of client device 120. In this example embodiment, access program 200 inputs URL 334 into browser window 412 the content corresponding to URL 334 to the user while the original livestream presentation continues to play on browser window 320.

In step 218, access program 200 collects data corresponding to the user interaction with the livestream video. In various embodiments, users authorize access program 200 to collect and store information associated with devices and users, which have authorized the collection of information (i.e., users that have opted-in), in storage device 142. In one scenario, an owner of client device 120 authorizes access program 200 to collect and store data (e.g., user interactions, user interests, published presentation material, etc.) of application 124. In another scenario, an owner of client device 120 authorizes access program 200 to perform a defined action on behalf of the owner using collected information of application 124. In an alternative embodiment, user's opt-in to utilize access program 200. For example, a user visits a website associated with access program 200 and the users accept the terms and conditions of access program 200 as a part of the registration process.

In one embodiment, access program 200 collects data corresponding to a user interaction with a video of application 124 of client device 120 and provides the collected data to a publisher of the video. For example, access program 200 monitors published materials (e.g., video, blogs, movies, presentations, etc.) and collects one or more user interactions (e.g., clicks, selections, etc.) of participants or viewers with the published materials and stores the collected data in a database (e.g., database 144). In this example, access program 200 can provide the collected to a presenter of the published materials for feedback (e.g., content corrections, presentation improvements, etc.).

Figure 5:
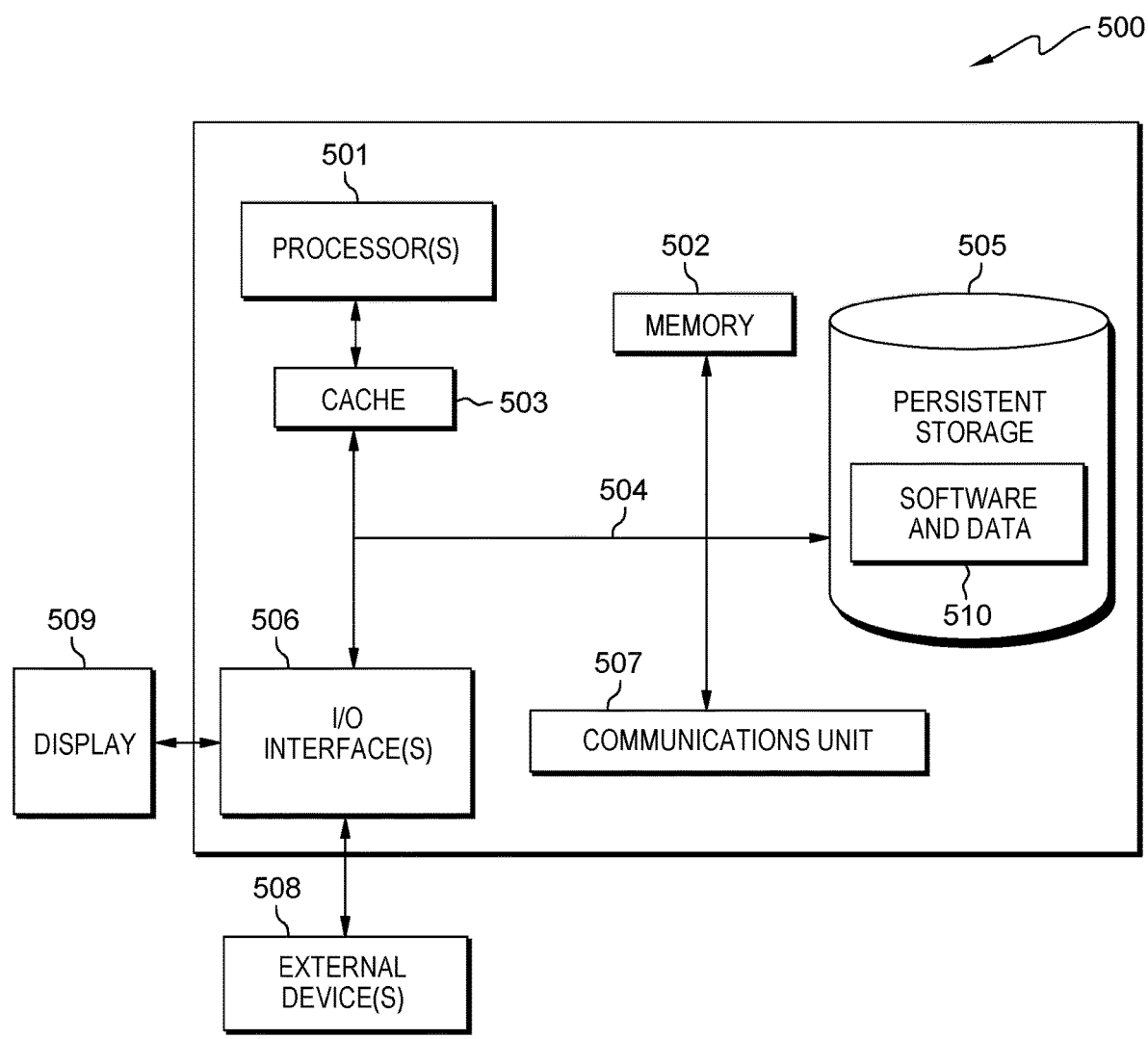
FIG. 5 is a block diagram of components of the client device and server of FIG. 1, in accordance with an embodiment of the present invention.

FIG. 5 depicts a block diagram of components of client device 120, user device 130, and server 140, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data 510) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 510 can be stored in persistent storage 505 for access and/or execution by one or more of the respective processor(s) 501 via cache 503. With respect to client device 120, software and data 510 includes data of user interface 122, application 124, access program 200, OCR module 220, and image extraction module 230. With respect to user device 130, software and data 510 includes data of user interface 132 and application 134. With respect to server 140, software and data 510 includes data of storage device 142.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., software and data 510) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., software and data 510) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more processors, a set of coordinates on a display of a computing device corresponding to an interaction from a user with a video presentation;
   extracting, by one or more processors, a subset of pixels from an image of the display of the computing device that corresponds to the set of coordinates, wherein extracting the subset of pixels from the image further comprises:
      identifying, by one or more processors, whitespace corresponding to one or more features of a segment of the image associated with the interaction from the user with the video presentation;
      defining, by one or more processors, an extraction area that includes a string of characters based at least in part on the whitespace, wherein the string of characters corresponds to the one or more features, wherein the subset of pixels is based on the extraction area;
   extracting, by one or more processors, a uniform resource locator (URL) from the subset of pixels of the image;
   validating, by one or more processors, the extracted URL from the subset of pixels of the image; and
   providing, by one or more processors, content corresponding to the extracted URL from the subset of pixels of the image to the user.

2. The method of claim 1, further comprising:
   providing, by one or more processors, a list of one or more devices for displaying the content to the user, wherein the one or more devices and the computing device are connected to a shared network.

3. The method of claim 2, further comprising:
   generating, by one or more processors, an interactive notification that includes the URL;
   identifying, by one or more processors, a user selected device from the provided list; and
   providing, by one or more processors, the interactive notification to the user selected device, wherein the user selected device is selected from a group consisting of: the one or more devices, and the computing device.

4. The method of claim 3, further comprising:
   collecting, by one or more processors, data associated with the interaction from the user with the video presentation, wherein the data includes user interests and validation status of the extracted URL; and
   transmitting, by one or more processors, the collected data to a presenter of the video presentation.

5. The method of claim 1, wherein validating the extracted URL of the subset of pixels of the image, further comprises:
   verifying, by one or more processors, that the extracted URL of the subset of pixels of the image specifies a correct location of the content; and
   determining, by one or more processors, whether the location of the content requires permission credentials.

6. The method of claim 1, further comprising:
   determining, by one or more processors, that the extracted URL from the subset of pixels of the image is not valid based at least in part on one or more errors, wherein the one or more errors correspond to issues resulting in a failure to access content corresponding to the extracted URL; and
   generating, by one or more processors, a notification that includes information corresponding to a validation status of the URL, wherein the validation status corresponds to the one or more errors.

7. The method of claim 1, wherein providing the content corresponding to the extracted URL of the subset of pixels of the image to the user, further comprises:
   opening, by one or more processors, a separate browser of the computing device of the user; and rendering, by one or more processors, the content corresponding to the extracted URL from the subset of pixels of the image on the separate browser of the computing device.

8. A computer program product comprising:
one or more computer readable storage media and program instructions stored on the one or more computer readable storage media, the program instructions comprising:
program instructions to determine a set of coordinates on a display of a computing device corresponding to an interaction from a user with a video presentation;
program instructions to extract a subset of pixels from an image of the display of the computing device that corresponds to the set of coordinates, wherein extracting the subset of pixels from the image further comprises:
identify whitespace corresponding to one or more features of a segment of the image associated with the interaction from the user with the video presentation;
define an extraction area that includes a string of characters based at least in part on the whitespace, wherein the string of characters corresponds to the one or more features, wherein the subset of pixels is based on the extraction area;
program instructions to extract a uniform resource locator (URL) from the subset of pixels of the image;
program instructions to validate the extracted URL from the subset of pixels of the image; and
program instructions to provide content corresponding to the extracted URL from the subset of pixels of the image to the user.

9. The computer program product of claim 8, further comprising program instructions, stored on the one or more computer readable storage media, to:
provide a list of one or more devices for displaying the content to the user, wherein the one or more devices and the computing device are connected to a shared network.

10. The computer program product of claim 9, further comprising program instructions, stored on the one or more computer readable storage media, to:
generate an interactive notification that includes the URL;
identify a user selected device from the provided list; and
provide the interactive notification to the user selected device, wherein the user selected device is selected from a group consisting of: the one or more devices, and the computing device.

11. The computer program product of claim 10, further comprising program instructions, stored on the one or more computer readable storage media, to:
collect data associated with the interaction from the user with the video presentation, wherein the data includes user interests and validation status of the extracted URL; and
transmit the collected data to a presenter of the video presentation.

12. The computer program product of claim 8, wherein program instructions to validate the extracted URL of the subset of pixels of the image, further comprise program instructions to:
verify that the extracted URL of the subset of pixels of the image specifies a correct location of the content; and
determine whether the location of the content requires permission credentials.

13. The computer program product of claim 8, further comprising program instructions, stored on the one or more computer readable storage media, to:
determine, by one or more processors, that the extracted URL from the subset of pixels of the image is not valid based at least in part on one or more errors, wherein the one or more errors correspond to issues resulting in a failure to access content corresponding to the extracted URL; and
generate a notification that includes information corresponding to a validation status of the URL, wherein the validation status corresponds to the one or more errors.

14. The computer program product of claim 8, wherein program instructions to provide the content corresponding to the extracted URL of the subset of pixels of the image to the user, further comprise program instructions to:
open a separate browser of the computing device of the user; and
render the content corresponding to the extracted URL from the subset of pixels of the image on the separate browser of the computing device.

15. A computer system comprising:
one or more computer processors;
one or more computer readable storage media; and
program instructions stored on the computer readable storage media for execution by at least one of the one or more processors, the program instructions comprising:
program instructions to determine a set of coordinates on a display of a computing device corresponding to an interaction from a user with a video presentation;
program instructions to extract a subset of pixels from an image of the display of the computing device that corresponds to the set of coordinates, wherein extracting the subset of pixels from the image further comprises:
identify whitespace corresponding to one or more features of a segment of the image associated with the interaction from the user with the video presentation;
define an extraction area that includes a string of characters based at least in part on the whitespace, wherein the string of characters corresponds to the one or more features, wherein the subset of pixels is based on the extraction area;
program instructions to extract a uniform resource locator (URL) from the subset of pixels of the image;
program instructions to validate the extracted URL from the subset of pixels of the image; and
program instructions to provide content corresponding to the extracted URL from the subset of pixels of the image to the user.

16. The computer system of claim 15, further comprising program instructions, stored on the one or more computer readable storage media for execution by at least one of the one or more processors, to:
provide a list of one or more devices for displaying the content to the user, wherein the one or more devices and the computing device are connected to a shared network.

17. The computer system of claim 16, further comprising program instructions, stored on the one or more computer readable storage media for execution by at least one of the one or more processors, to:
generate an interactive notification that includes the URL;
identify a user selected device from the provided list; and provide the interactive notification to the user selected device, wherein the user selected device is selected from a group consisting of: the one or more devices, and the computing device.

18. The computer system of claim 17, further comprising program instructions, stored on the one or more computer readable storage media for execution by at least one of the one or more processors, to:

collect data associated with the interaction from the user with the video presentation, wherein the data includes user interests and validation status of the extracted URL; and transmit the collected data to a presenter of the video presentation.

19. The computer system of claim 15, wherein program instructions to validate the extracted URL of the subset of pixels of the image, further comprise program instructions to:

verify that the extracted URL of the subset of pixels of the image specifies a correct location of the content; and determine whether the location of the content requires permission credentials.

20. The computer system of claim 15, further comprising program instructions, stored on the one or more computer readable storage media for execution by at least one of the one or more processors, to:

determine, by one or more processors, that the extracted URL from the subset of pixels of the image is not valid based at least in part on one or more errors, wherein the one or more errors correspond to issues resulting in a failure to access content corresponding to the extracted URL; and generate a notification that includes information corresponding to a validation status of the URL, wherein the validation status corresponds to the one or more errors.

* * * * *